United States Patent
Esaki

(10) Patent No.: US 10,412,247 B2
(45) Date of Patent: Sep. 10, 2019

(54) IMAGE READING DEVICE CONFIGURED TO TRANSMIT IMAGE DATA AND IMAGE DATA TRANSMITTING METHOD THEREFOR

(71) Applicant: BROTHER KOGYO KABUSHIKI KAISHA, Nagoya, Aichi (JP)

(72) Inventor: Satoshi Esaki, Aichi (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 0 days.

(21) Appl. No.: 15/849,869

(22) Filed: Dec. 21, 2017

(65) Prior Publication Data

US 2018/0183960 A1     Jun. 28, 2018

(30) Foreign Application Priority Data

Dec. 26, 2016 (JP) .................................. 2016-251812

(51) Int. Cl.
*H04N 1/00* (2006.01)

(52) U.S. Cl.
CPC ..... *H04N 1/00798* (2013.01); *H04N 1/00244* (2013.01); *H04N 1/00411* (2013.01); *H04N 1/00477* (2013.01); *H04N 2201/0081* (2013.01); *H04N 2201/0094* (2013.01)

(58) Field of Classification Search
CPC ........... H04N 1/00798; H04N 1/00244; H04N 1/00411; H04N 1/00477; H04N 2201/0081; H04N 2201/0094
See application file for complete search history.

(56) References Cited

U.S. PATENT DOCUMENTS

| 2007/0195375 A1* | 8/2007 | Morimoto .......... H04N 1/00222 |
| | | 358/407 |
| 2007/0211305 A1* | 9/2007 | Tanida ............... H04N 1/32117 |
| | | 358/448 |
| 2018/0253386 A1* | 9/2018 | Qiu ......................... G06F 3/061 |

FOREIGN PATENT DOCUMENTS

| JP | 2004-140432 A | 5/2004 |
| JP | 2005-197796 A | 7/2005 |
| JP | 2005-318545 A | 11/2005 |
| JP | 2006-180344 A | 7/2006 |
| JP | 2007-228079 A | 9/2007 |

* cited by examiner

*Primary Examiner* — Iriana Cruz

(74) *Attorney, Agent, or Firm* — Scully, Scott, Murphy & Presser, P.C.

(57) ABSTRACT

An image reading device is configured such that, when first and second external devices are designated as destinations of image data, a controller of the image reading device controls an image reader to read an image on the original and generate image data, stores the image data in a storage, transmits the image data stored in the storage to the first external device, determine whether transmission of the image data to the first external device is successfully completed, transmits the image data stored in the storage to the second external device, determine whether transmission of the image data to the second external device is successfully completed. When transmission of the image data to the first external device is successfully completed and transmission of the image data to the second external device is failed, the controller transmits a deletion instruction to delete the image data to the first external device.

7 Claims, 8 Drawing Sheets

IMAGE READING DEVICE CONFIGURED TO TRANSMIT IMAGE DATA AND IMAGE DATA TRANSMITTING METHOD THEREFOR

CROSS-REFERENCE TO RELATED APPLICATIONS

This application claims priority under 35 U.S.C. § 119 from Japanese Patent Application No. 2016-251812 filed on Dec. 26, 2016. The entire subject matter of the application is incorporated herein by reference.

BACKGROUND

Technical Field

The present disclosures relate to an image reading device and an image data transmitting method. More specifically, the present disclosures relate to a technique of transmitting image data, which is generated by an image reading device, to external devices.

Related Art

Conventionally, there has been known a technique of reading an image on an original document and generate image data with an image reading device capable of communicating with external devices, and transmitting the generated image data to external devices designated as destinations.

According to the conventional technique, the reading device typically transmits the image data to a plurality of external devices in accordance with network protocols respectively employed in the external devices, which are designated as destinations of the transmitted image data.

SUMMARY

When the image data is transmitted to a plurality of external devices, there could occur one of three cases below. In a first case, the image data is successfully transmitted to all the external devices. In a second case, transmission of the image data to anyone of the external devices is failed. In a third case, the image data is successfully transmitted to some of the plurality of external devices, while the transmission to the other external devices is failed.

When the image data is successfully transmitted to some of the plurality of external devices, while transmission of the image data to the other external devices is failed, a problem indicated below arises. If the user intends to re-designate the external devices, to which the data transmission was failed, it is troublesome for the user to search for the external devices to be re-designated and designate the same. In particular, when the number of external devices is relatively large, the troublesomeness is significant. In order to avoid such a troublesome process of re-designating the external devices, it may be considered to re-transmit the data to all the external devices. In such a case, however, the same data is re-transmitted to the external devices to which the data was successfully transmitted previously. Such a procedure is useless. Further, such a procedure arises another problem. That is, when a user of an external device receives the data twice, it is unclear for the user whether the two pieces of data are the same data or not.

In consideration of the above problem, according to the present disclosures, there is provided a technique to avoid a situation where, when the image data is transmitted to a plurality of external devices and transmission to some of the plurality of external devices has been successfully completed and the image data is stored therein, while transmission to the other of the plurality of external devices has been failed and the image data is not stored therein.

According to aspects of the present disclosures, there is provided an image reading device, which has an image reader configured to read an image on an original document and generate image data corresponding to the image on the original document, a communication interface configured to interface communication with a first external device and a second external device, a storage and a controller. When the first external device and the second external device are designated as transmission destinations of the image data, the controller is configured to execute a generating process of causing the image reader to read the image on the original document and generate the image data, a storing process of storing the image data generated by the generating process in the storage, a first transmission process of causing the communication interface to transmit the image data stored in the storage to the first external device, a first determination process of determining whether transmission of the image data to the first external device is successfully completed, a second transmission process of causing the communication interface to transmit the image data stored in the storage to the second external device, a second determination process of determining whether transmission of the image data to the second external device is successfully completed. When the controller determines that transmission of the image data to the first external device is successfully completed and transmission of the image data to the second external device is failed, a deletion process to control the communication interface to transmit a deletion instruction to delete the image data to the first external device.

According to aspects of the present disclosures, there is provided an image reading device configured to read an image on an original document and generate image data corresponding to the image on the original document. The image reading device has a communication interface configured to communicate with a plurality of external devices, a storage, and a controller. When the plurality of external devices are designated as transmission destinations of the image data, the controller is configured to control the image reader to cause the image reader to read the image on the original and generate image data, store the image data generated in the generating process in the storage, control the communication interface to transmit the image data stored in the storage, determine whether transmitting the image data to each of the plurality of external devices designated as destinations is successfully completed, in response to determination that there exists at least one external device to which transmission of the image data is failed, and control the communication interface to transmit a deletion instruction to delete the image data to the external devices to which transmission of the image data has been successfully completed.

According to aspects of the present disclosures, there is provided an image data transmitting method for an image reading device having an image reader configured to read an image on an original document and generate image data corresponding to the image on the original document, and a communication interface configured to interface communication with a first external device and a second external device. When the first external device and the second external device are designated as transmission destinations of the image data, the method includes controlling the image reader to read the image on the original document and generate the image data, storing the image data generated by the generating step in the storage, controlling the communication interface to transmit the image data stored in the storage by the storing step to the first external device, determining whether transmission of the image data to the first external device is successfully completed, controlling the communication interface to transmit the image data stored in the storage to the second external device, determining whether transmission of the image data to the second external device is successfully completed, and when it is determined that transmission of the image data to the first external device is successfully completed and transmission of the image data to the second external device is failed, controlling the communication interface to transmit a deletion instruction to delete the image data to the first external device.

BRIEF DESCRIPTION OF THE ACCOMPANYING DRAWINGS

Figure 9:
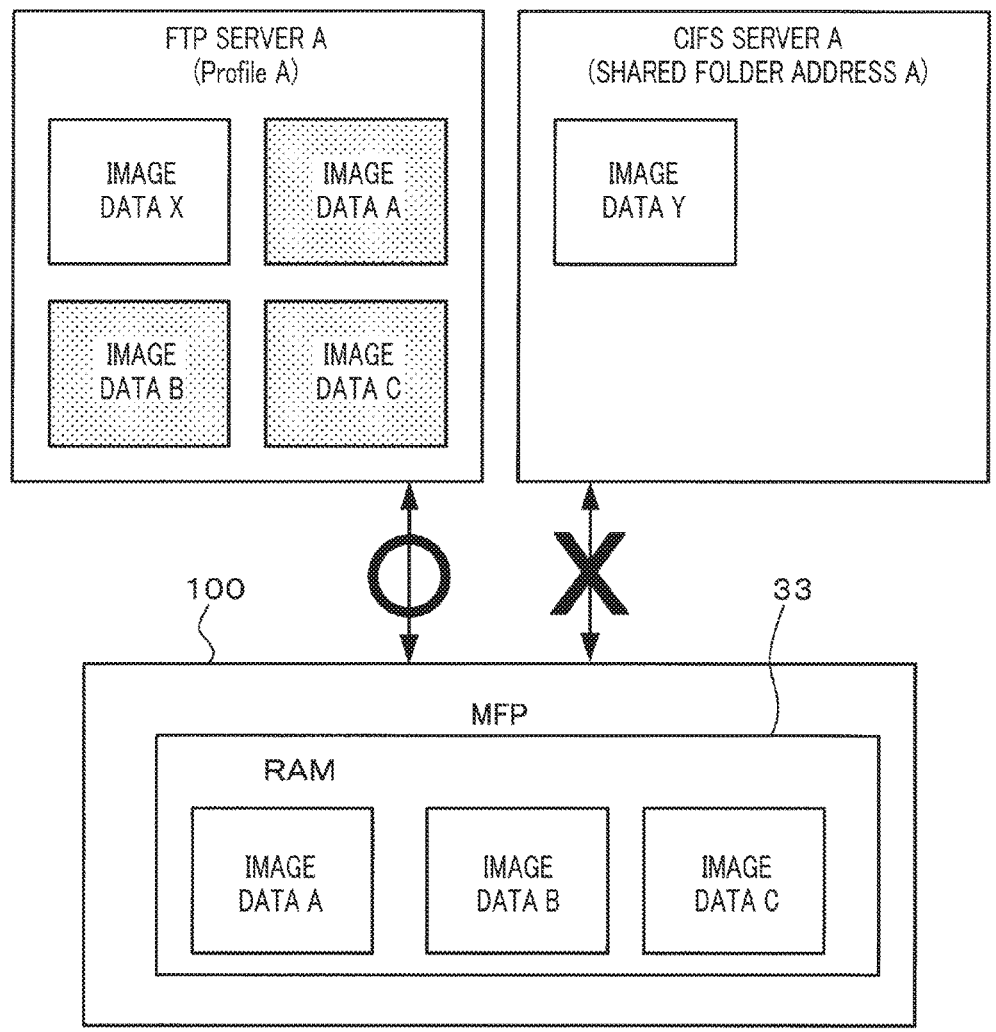

FIG. 9 schematically illustrate the transmitted data deletion process.

Figure 10:
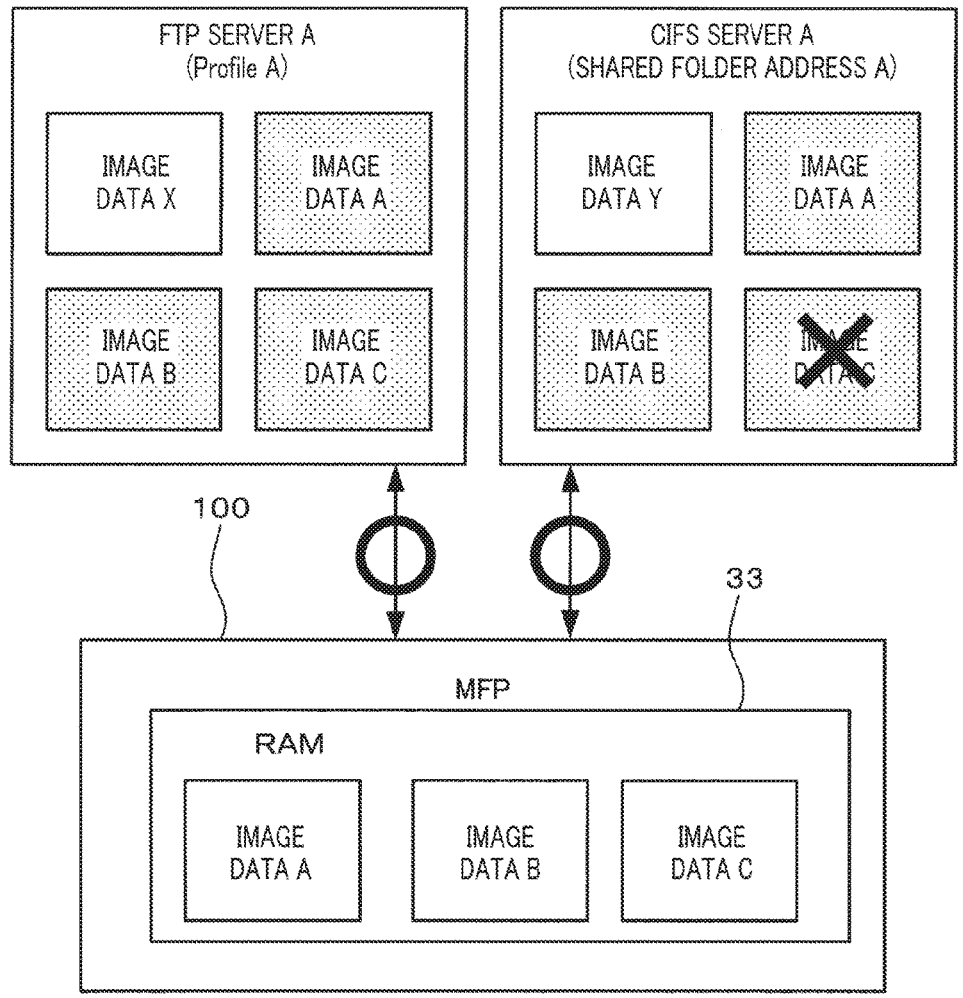

FIG. 10 schematically illustrate the deletion process to delete transmitted data of connected servers.

DETAILED DESCRIPTION OF THE EMBODIMENT

Hereinafter, referring to the accompanying drawings, an MFP 100 according to an embodiment of the present disclosures will be described in detail.

Figure 1:
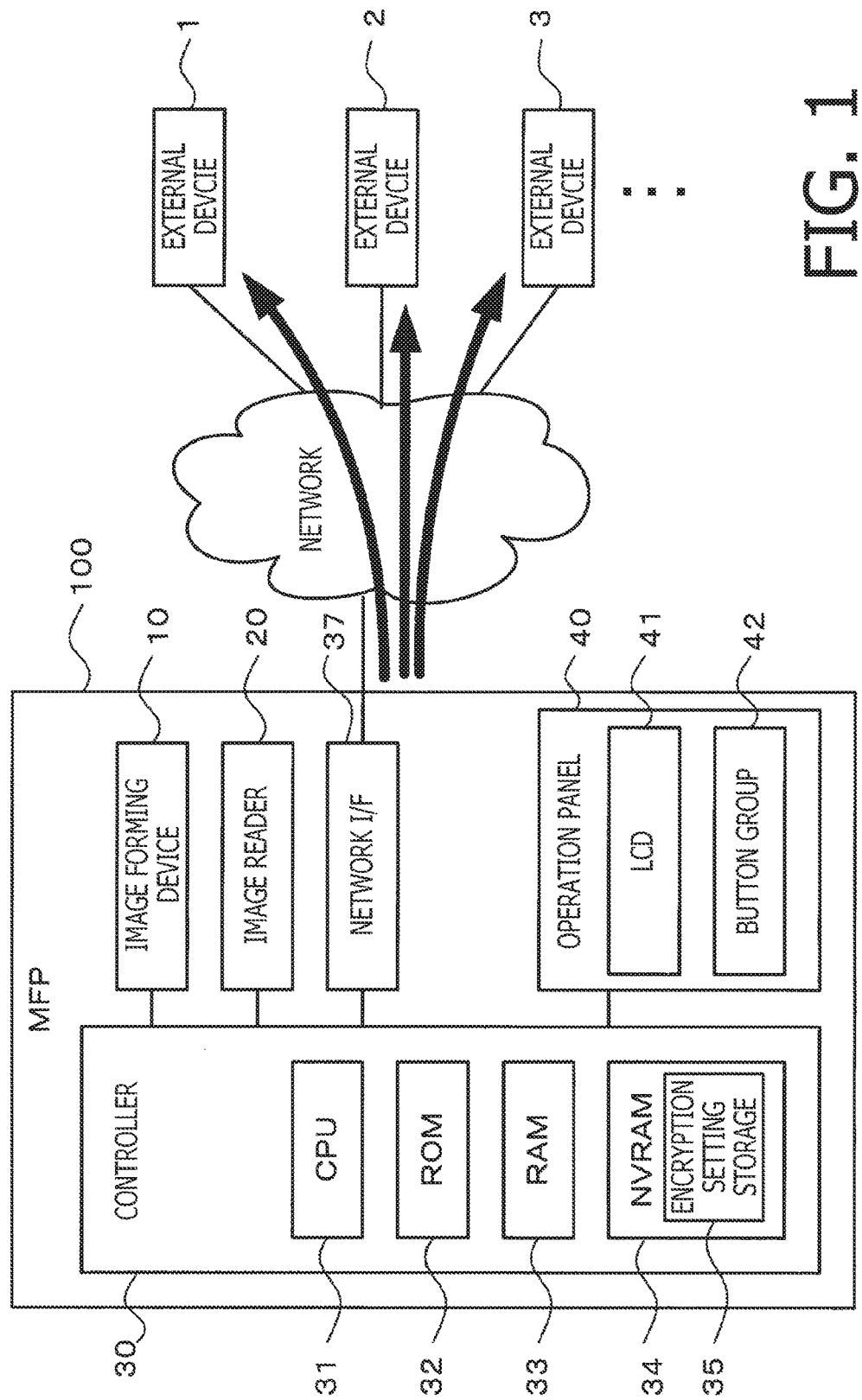
FIG. 1 is a block diagram showing an electrical configuration of an image reading device of an embodiment according to aspects of the disclosures.

The MFP 100 has a controller 30 which includes, as shown in FIG. 1, a CPU 31, a ROM 32, a RAM 33 and an NVRAM 34. The MFP 100 also has an image forming device 10, an image reading device 20 and a network I/F 37, an operation panel 40, which are electrically connected to the controller 30.

The image forming device 10 is configured to print an image on a printing sheet. The image forming device 10 may employ an electrophotographic image forming method or an inkjet printing method. Further, the MFP 100 may be configured to form a color image or only a monochromatic image. Furthermore, the MFP 100 may perform a duplex printing, or only an simplex printing.

The image reading device 20 is configured to read an image formed on an original document. The image reading device 20 may read an image in accordance with a CCD method, or a CIS method. The MFP 100 according to the present disclosure may read a color image, or only a monochromatic image. The image reading device 20 is an example of a reader.

The ROM 32 stores control programs to control operations of the MFP 100, various settings and initial values. The RAM 33 is used as a work area in which retrieved control programs are developed, or various pieces of data are temporarily stored. The RAM 33 is an example of a storage. The NVRAM 34 is used to store various pieces of data such as image data, various setting, and user information. The NVRAM 34 includes an encryption setting storage 35. The encryption setting storage 35 is configured such that, when a setting to encrypt the image data is enabled, an encryption flag is set to "1", while, when the setting to encrypt the image data is disabled, the encryption flag is set to "0".

When a data format corresponding to an encryption method is selected, and a password used for the encryption has been input, the encryption flag is set to "1". On the other hand, when a data format corresponding to the encryption method has not been selected or a password used for the encryption has not been input even though the data format has been selected, the encryption flag is set to "0".

The CPU 31 controls operations of respective components of the MFP 100 in accordance with the control programs retrieved from the ROM 32 with storing results of execution of the control programs in the RAM 33 or NVRAM 34. The CPU 31 is an example of a controller. It is noted that the controller 30 may be the controller set forth in the claims. It is noted that the controller 30 is a collective term including hardware used in the controlling operations of the MFP 100, and need not correspond to a single piece of hardware existing in the MFP 100.

The network I/F 37 is hardware used to communicate with an external device connected to a network. A communication method employed in the network I/F 37 may be a wireless or wired method. The network I/F is an example of a communication interface.

The operation panel 40 is provided with an LCD 41 and a button group. The LCD 41 is an example of a display device. The button group is an example of an accepting device. The controller 40 displays various pieces of information such as an operation state and/or a message for the user on the LCD 41 of the operation panel 40. The LCD 41 may be configured as a touch panel through which an input operation can be performed. In such a case, the MFP 100 may be configured to display various buttons on the LCD 41, and receive instructions based on the touched position on the touch panel. It is noted that when the LCD 41 is configured as the touch panel, the LCD 41 is an example of the accepting device.

The button group 42 includes a power button, an execution button, a cancel button and numeral keys. The controller 30 is configured such that, when an operation with respect to the button group 42 is received, the controller 30 receives a signal which is generated in response to an operation of the button, thereby receiving an input of an instruction.

According to the embodiment, it is assumed that external devices 1, 2 and 3 are connected to the network. Examples of the external devices 1, 2 and 3 may include a server, a personal computer (PC), a mobile phone, a printer, and an MFP.

Next, a plural-destination transmission function implemented in the MFP 100 will be described. The plural-destination transmission function is a function of transmitting image data of an image read by the MFP 100 to a plurality of external devices.

For executing a job using the plural-destination transmission function, transmission destinations are stored, in advance, in the MFP 100. For example, the transmission destinations may be selected from an address book stored in the MFP 100. Alternatively or optionally, the transmission destinations may be directly input by the user. Further optionally or alternatively, the transmission destinations may be set to the MFP 100 through a PC.

Figures 2, 3:
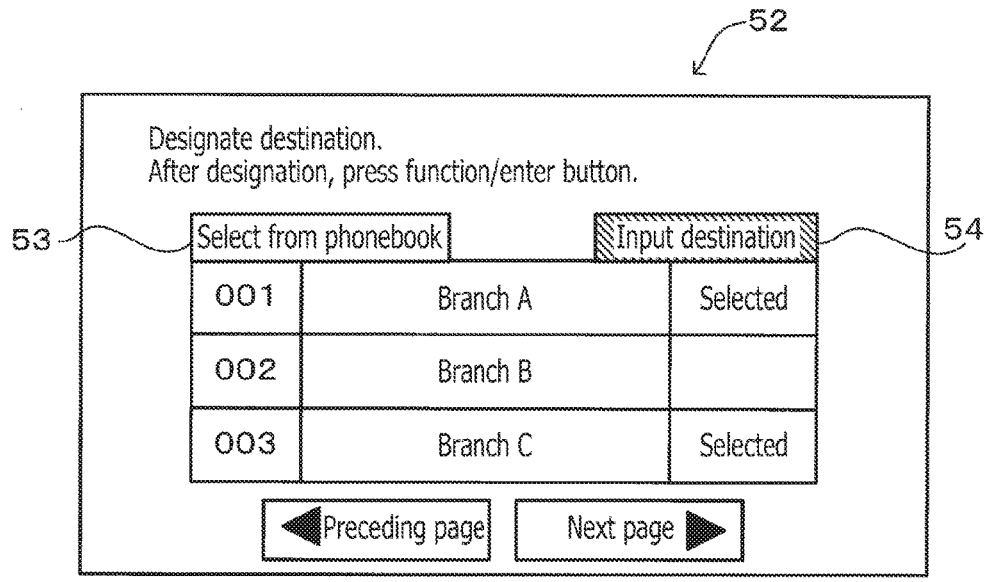
FIG. 2 shows an example of a destination designation screen.
FIG. 3 shows an example of a transmission destination list.

For example, the MFP 100 may display a destination designation screen 52 as shown in FIG. 2 on the LCD 41. On the destination designation screen, a tag 53 and tag 54 are displayed. When the tag 53 is selected, the transmission destination can be selected from the address book. When the tag 54 is selected, the transmission destinations are directly input by the user.

When the user selects the tag 53, the address book is displayed on the LCD 41. On the address book displayed on the LCD 41, names of users of external devices subject to selection are indicated. The user may designate the transmission destinations by operating the button group 42 to select the names of the users. As shown in FIG. 2, the selected destinations are indicated by an indication of "selected". Therefore, the user can confirm whether selection has been made for each name of the users.

It is noted that, the MFP 100 creates a telephone book such that telephone book records are generated with the names of the users, transmission methods and transmission addressed are mutually associated, and stored in a telephone book database. The telephone book database is stored in the NVRAM 34.

As shown in FIG. 3, in the field of the transmission method, protocols to be used for transmitting image data to the external devices are registered. The protocols used may include an FTP (file transfer protocol), an SMB (server message block), a CIFS (common internet file system), an NFS (network file system), and an HTTP (hypertext transfer protocol). In addition to differences of the protocols to be used, even if the same protocol is used, the destinations may be different, or even if the destinations are the same, portions for storing the image data (e.g., recording media, or recording areas) may be different.

In the field of the destination address (see FIG. 3), information to identify the external devices is registered. In the field of the destination address, when, for example, a protocol (e.g., FTP) regarding data transmission is registered in the field of the transmission method, a profile containing connection information of a connection destination is registered. When a network (e.g. CIFS) is registered in the field of the transmission method, a shared folder address identifying a shared folder is registered.

As above, in the MFP 100, when the name is selected in the telephone book, the transmission method and the transmission address corresponding to the selected external device can be obtained easily.

On the other hand, for example, when an address which is not registered in the telephone book is to be designated, the user may select the tag 54. Then, an address input screen encouraging the user to manually input the transmission method and the transmission address is displayed on the LCD 41. Then, the user may designate the destination by inputting the transmission method and the destination address by operating the button group 42. As above, the MFP 100 can transmit the image data to the destination which is not registered in the telephone book.

When the destination address is received, the MFP 100 creates the transmission destination list. The MFP 100 generates the transmission destination records containing the transmission method and the destination address in accordance with the order of designation, and registers the record with the transmission destination address. For example, it is assumed that, in the telephone book shown in FIG. 2, if a branch A is designated first, and then the branch C is designated. In such a case, as shown in FIG. 3, as the first record, the protocol "FTP" which is used in the FTP server A of the branch A is registered as the transmission method, and "Profiles A" of the FTP server A is registered as the destination address. As the second record, the protocol "CIFS" which is used in the CIFS server A of the branch C is registered as the transmission method, while the shared folder address of the CIFS server A will be registered as the destination address.

When the transmission destination list has been created, the MFP 100 controls the image reading device 20 to read an image on an original document and generates image data. Then, the MFP 100 controls the RAM 33 to store the thus generated image data. Thereafter, the MFP 100 connects with the external devices in accordance with the order of the transmission destination list, and transmits the image data stored in the RAM 33. That is, the MFP 100 completes transmission of the image data to the external device having been registered earlier, and thereafter, the MFP 100 starts transmitting the image data to the external device having been registered later.

Figure 4:
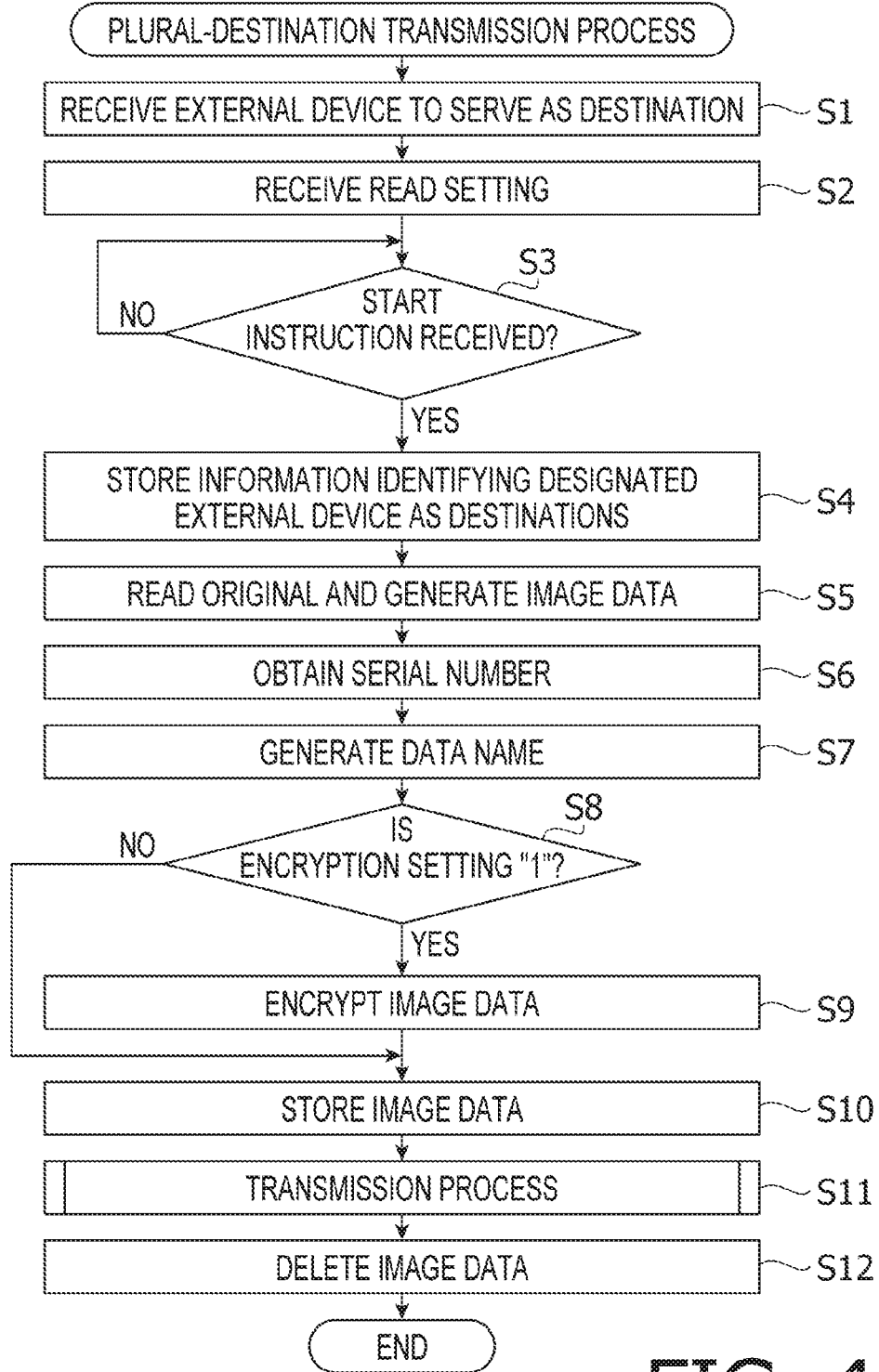
FIG. 4 is a flowchart illustrating a plural-destination transmission process.

Next, a plural-destination transmission process executed by the MFP 100 will be described with reference to the flowchart shown in FIG. 4. The plural-destination transmission process is executed by the CPU 31 in response to receipt of the plural-destination transmission instruction which is input through the button group 42.

In the plural-destination transmission process, the CPU 31 firstly receives user's selection of the external devices which are the transmission destinations (S1). The external devices which are the transmission destination may be designated, for example, through the destination designation screen displayed on the LCD 41. In this case, the external devices are selected from the telephone book stored in the NVRAM 34 of the MFP 100 and/or manually designated through the button group 42.

Next, the CPU 31 receives a read setting through the button group 42 (S2). In the read setting, a condition to read the image on the original document and generate the image data is set. The read setting may include, for example, a setting of data format when the image data is stored in the RAM 33.

Thereafter, when a start instruction is received through the button group (S3: YES), the CPU 31 stores information identifying the external devices in the NVRAM 34 as the transmission destinations (S4). That is, the CPU 31 creates the transmission destination list 51 based on the external devices designated in S1. Then, the CPU 31 stores the transmission destination list 51 in the NVRAM 34.

Then, the CPU 31 causes the image reading device 20 to read the image on the original document, and generates the image data (S5). It is noted that a process in S5 is an example of a generating process. The image reading device 20 may read images on the original documents conveyed by a not-shown ADF or read an image of an original document which is placed on a platen by the user.

Next, the CPU 31 obtains a serial number (S6). The serial number is a number of pages of the original document counted when the MFP 100 controls the image reading device 20 to read the original document.

Thereafter, the CPU 31 generates a data name to identify the image data (S7). The data name is an example of identification information. As a method of creating the data name, the user can select either an automatic setting or a manual setting. The automatic setting is a setting according to which the MFP 100 automatically generates the data name. According to the automatic setting, the MFP 100 connects, for example, the serial number obtained in S6 and a particular character string (e.g., "IMG") to generate the data name (e.g., "IMG0021"). The manual setting is a setting according to which the user is allowed to generate the data name by operating the button group 42. In the manual setting, when the user operates the button group 42 to generate the data name, the serial number obtained in S6, date and time, information intrinsic to the MFP 100 may be included in the data name By including such data, it becomes easy to generate a new data name which may hardly overlap the existing data name.

The CPU 31, which generated the data name, determines whether the encryption flag is set to "1" (S8). When it is determined that the encryption flag stored in the encryption setting storage 35 is set to "0" (S8: NO), the CPU 31 proceeds to S10 without encrypting the image data. When it is determined that the encryption flag stored in the encryption setting storage 35 is set to "1" (S8: YES), the CPU 31 encrypts the generated image data (S9) and proceeds to S10.

Thereafter, the CPU 31 stores the image data in the RAM 33 (S10). The process in S10 is an example of a storing process. That is, the CPU 31 controls the RAM 33, for example, to name the image data of the image on the original document read in S5 the data name set in S7, and stores the same. When, for example, the data format is set to a PDF, the CPU 31 stores one piece of image data in the RAM 33 when an image of one sheet of the original document is read, or when images of a plurality of original sheets are read. On the other hand, when, for example, the data format is set to the JPEG in S2, the same number, as the number of pages of the original document, of pieces of image data are stored in the RAM 33. It is noted that, when the encryption flag stored in the encryption setting storage 35 is set to "1", the encrypted image data is stored in the RAM 33.

When storing of the image data has completed, the CPU 31 executes the transmission process (S11). Then, the CPU 31 deletes the image data stored in the RAM 33 (S12), and terminates the plural-destination transmission process. That is, the CPU 31 sequentially transmits the image data to the plurality of external devices. However, if there is an external device which cannot be connected among the plurality of designated external devices, the CPU 31 cannot transmit the image data to the external device to which connection cannot be made. If the CPU 31 continues transmitting the image data to the other external devices with maintaining the above situation, the image data subject to transmission is stored in part of the external devices, while the image data subject to transmission is not stored in the other external devices. In such a state, it becomes difficult to manage the image data.

In consideration of the above, according to the present embodiment, the transmission process is configured such that, if there is one or more external devices to which the image data cannot be transmitted, image data having been successfully transmitted is deleted so that the image data subject to transmission is not remained in anyone of the designated external devices.

The transmission process will be described with referring to a flowchart shown in FIG. 5. In the transmission process shown in FIG. 5, the CPU 31 sequentially transmits the image data to the designated external devices in accordance with the designated protocols in the order registered in the transmission destination list 51 generated in S4 of FIG. 4.

The CPU 31 sets the order N of the external devices to "0" (S21). Then, the CPU 31 add "1" to the order N of the external devices (S22). With the above process, the CPU 31 can read the transmission destination list 51 from the first record without fail.

The CPU 31 obtains an N-th destination (S23). At a stage where transmission of the image data is started, the order N of the external device is set to "1". Therefore, the CPU 31 retrieves a first destination record from the transmission destination list 51 stored in the NVRAM 34, and obtains the "transmission method" and the "transmission destination address" of the first destination record.

The CPU 31 transmits a connection request to the N-th destination (S24). The CPU 31 causes the network I/F 37 to the "destination address" obtained in S23 in accordance with the "transmission method" obtained in S23.

Thereafter, the CPU 31 determines whether the connection has successfully established (S25). The process in S25 is an example of a first determination process and a second determination process. Whether the connection request is successfully made or not is determined based on whether the CPU 31 has received connection admission from the external device to which the CPU 31 transmitted the connection request through the network I/F 37.

When the connection admission is received from the destination to which the connection request was transmitted, the CPU 31 determines that connection is successfully made (S25: YES), and executes an image data transmitting process (S26). The process in S26 is an example of the first transmission process and the second transmission process.

The image data transmission process will be described with referring to a flowchart shown in FIG. 6. In the image data transmission process, the CPU 31 transmits the image data subject to transmission piece by piece to the external devices with which connections were successfully made with checking whether transmission has been successfully made.

That is, the CPU 31 sets the order M of the image data to "0" (S41). Thereafter, the CPU 31 adds "1" to the order M of the image data (S42). With this procedure, it becomes possible that the CPU 31 transmits the image data subject to transmission from the first piece in accordance with the reading order of the original document without fail.

Next, the CPU 31 transmits the M-th image data and the identification information to the N-th destination (S43). The process in S43 is an example of the first transmission process and the second transmission process. That is, the CPU 31 controls the RAM 33 to extracts the M-th image data and start transmitting the same to the N-th one of the external devices with which connection was successfully made. To the image data, a data name is given. The CPU 31 transmits the data name as the identification information together with the image data. The data name is an example of the identification information. With the above configuration, the external device can distinguish the image data from the other pieces of image data based on the identification information.

Thereafter, the CPU 31 determines whether the transmission has been successfully made (S44). The process in S44 is an example of the first determination process and the second determination process. For example, when the network cable is removed from the external device when the image data is being transmitted, the image data cannot be transmitted anymore. When the external device is connected through the wireless communication, depending on a radio wave environment, the wireless communication may be disabled. In such a case, there would be no guarantee that the CPU 31 transmits all the pieces of image data. Therefore, the CPU 31 checks whether the image data has been completely transmitted every time when one piece of image data is transmitted.

When the transmission has been successfully made (S44: YES), the CPU 31 determines whether transmission of all the pieces of image data has completed (S45). The CPU 31 grasps the total number of pieces of the image data subject to transmission when the CPU 31 reads the image on the original document in S5 of FIG. 4 and generates the image data. Therefore, the CPU 31 compares the total number with the order M of the image data set in S42, and when they do not coincide, the CPU 31 determines that there remains image data which has not been transmitted. In such a case (S45: NO), the CPU 31 returns to S42, adds "1" to the order M of the image data, and repeats the process in S43 onwards.

After transmitting all the pieces of image data, by executing S42-S45, to the N-th destination (S45: YES), the CPU 31 proceeds to S27 of FIG. 5, and transmits a disconnection request to the external device currently connected. Then, the external device, to which transmission of the image data has been completed, is disconnected from the MFP 100, thereby the external device becoming able to execute another job.

Thereafter, the CPU 31 determines whether the transmission process has been executed for all the transmission destinations (S28). The CPU 31 grasps the total number of the designated external devices based on the transmission destination list 51 generated in S4 of FIG. 4. Therefore, the CPU 31 compares the total number of the designated external devices with the order N of the external device set in S22. When the total number does not coincide with the order N, the CPU 31 determines that the image data has not yet been transmitted to all the destinations (S28: NO). In this case, the CPU 31 returns to S22, add "1" to the order N of the external device, and repeats the processes from S23. Thus, the CPU 31 starts transmitting the image data to the next order external device after the data transmission to the previous order external device has successfully completed.

When the CPU 31 has successfully connected to each of the external devices registered with the transmission destination list 51 and successfully transmitted the image data to each of the registered external devices, the CPU 31 determines that transmission of the image data to all the destinations has been completed (S28: YES). Then, in S29, the CPU 31 controls the LCD 41 to display a transmission completion screen. Thereafter, the CPU 31 proceeds to S12 of FIG. 4, deletes the image data stored in the RAM 33 and terminates the plural-destination transmission process.

The description above addresses a case where the image data has been successfully transmitted to all the designated external device. When there is an external device to which transmission of the image data is failed, the CPU 31 executes a process described below.

That is, when the connection with the N-th destination is failed and the image data cannot be transmitted to the N-th destination (S25: NO), the CPU 31 determines, with remaining the image data untransmitted, whether the encryption flag is set to "1" or not (S30).

When it is determined that the encryption flag stored in the encryption setting storage 35 is set to "0" (S30: NO), the CPU 31 proceeds to S12 without executing a transmitted data deletion process, deletes the image data stored in the RAM 33, and terminates the plural-destination transmission process. When the encryption flag is set to "0", the image data is not encrypted. The secrecy of image data which is not encrypted is not considered to be high. It is not problematic even if the image data of which secrecy is not high is remained in the designated external devices. Further, when transmission of the image data is retried, if image data having been transmitted is remained in the external devices, time and trouble to transmit the image data to such external devices may be saved. Therefore, when the encryption flag is set to "0", the CPU 31 proceeds to S12 without transmitting a deletion instruction to delete the transmitted image data to the external devices to which the image data has been successfully transmitted. In S12, the CPU 31 deletes the image data stored in the RAM 33, and terminates the plural-destination transmission process.

When the encryption flag stored in the encryption setting storage 35 is set to "1" (S30: YES), the CPU 31 executes the transmitted data deletion process to delete the image data having been transmitted (S31). The process in S31 is an example of a deletion process. When the encryption flag is set to "1", the image data having been transmitted is encrypted. Such encrypted image data is considered to have high secrecy. Therefore, it is not preferable that such image data is remained in part of the plurality of external devices. Therefore, according to the embodiment, the CPU 31 transmits a deletion instruction to delete the transmitted image data to the external devices of which order is earlier than the external device with which the connection was failed.

Figure 8:
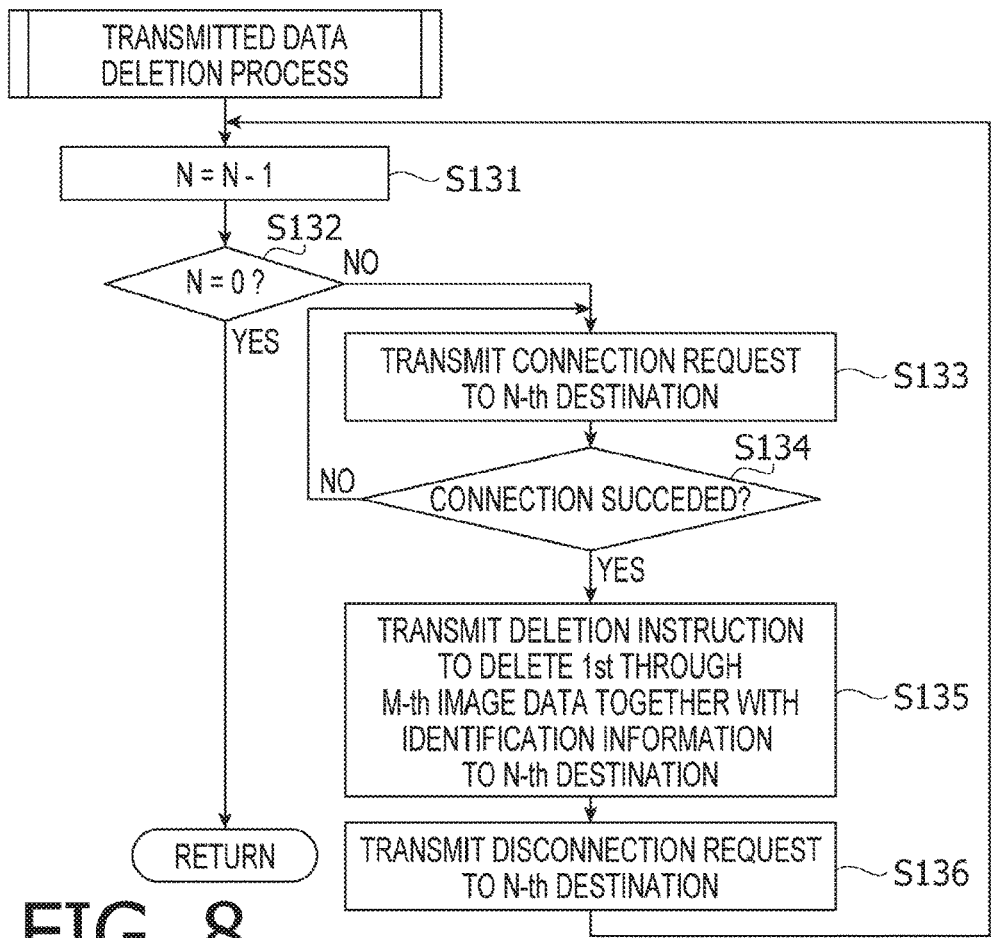
FIG. 8 is a flowchart illustrating a transmitted data deletion process.

The transmitted data deletion process will be described with reference to the flowchart shown in FIG. 8. In the transmitted data deletion process, the CPU 31 transmits the deletion instruction to delete the image data which has been transmitted to the external devices to the external devices to which the image data was successfully transmitted, so that the image data is not remained in the designated external devices.

That is, the CPU 31 subtracts "1" from the order N of the external device (S131). With this control, the CPU 31 is enabled to execute the process of the previous external device the order of which is smaller, by one, than that of the external device 1 with which the connection was filed.

Next, the CPU 31 determines whether the order N of the external device is "0" (S132). When it is determined that the order N of the external device is "0" (S132: YES), the external device with which connection is failed is the first external device, and the image data will not be remained in the designated external devices. Therefore, in such a case, the CPU 31 proceeds to S12 of FIG. 4, deletes the image data stored in the RAM 33, and terminates the plural-destination transmission process.

When it is determined that the order N of the external device is not "0" (S132: NO), there exist external devices in which the image data is remained. In this case, the CPU 31 controls the network OF 37 to transmit the connection request to the N-th destination (S133). Since the external device to which the image data has been successfully transmitted is disconnected as illustrated in S27 of FIG. 5, it is necessary to re-connect to such an external device. Since the connection with the external device was established when the image data was transmitted, the CPU 31 awaits until the re-connection is established (S134: NO).

When the re-connection with the external device is established (S134: YES), the CPU 31 controls the network OF 37 to transmit the deletion instruction to delete the first through M-th image data to the N-th destination (S135). That is, the CPU 31 transmits the deletion instruction to delete all the pieces of the image data successfully transmitted to the external device currently being connected. With this configuration, the external device which has received the deletion instruction deletes the first to M-th image data having been received.

Figure 6:
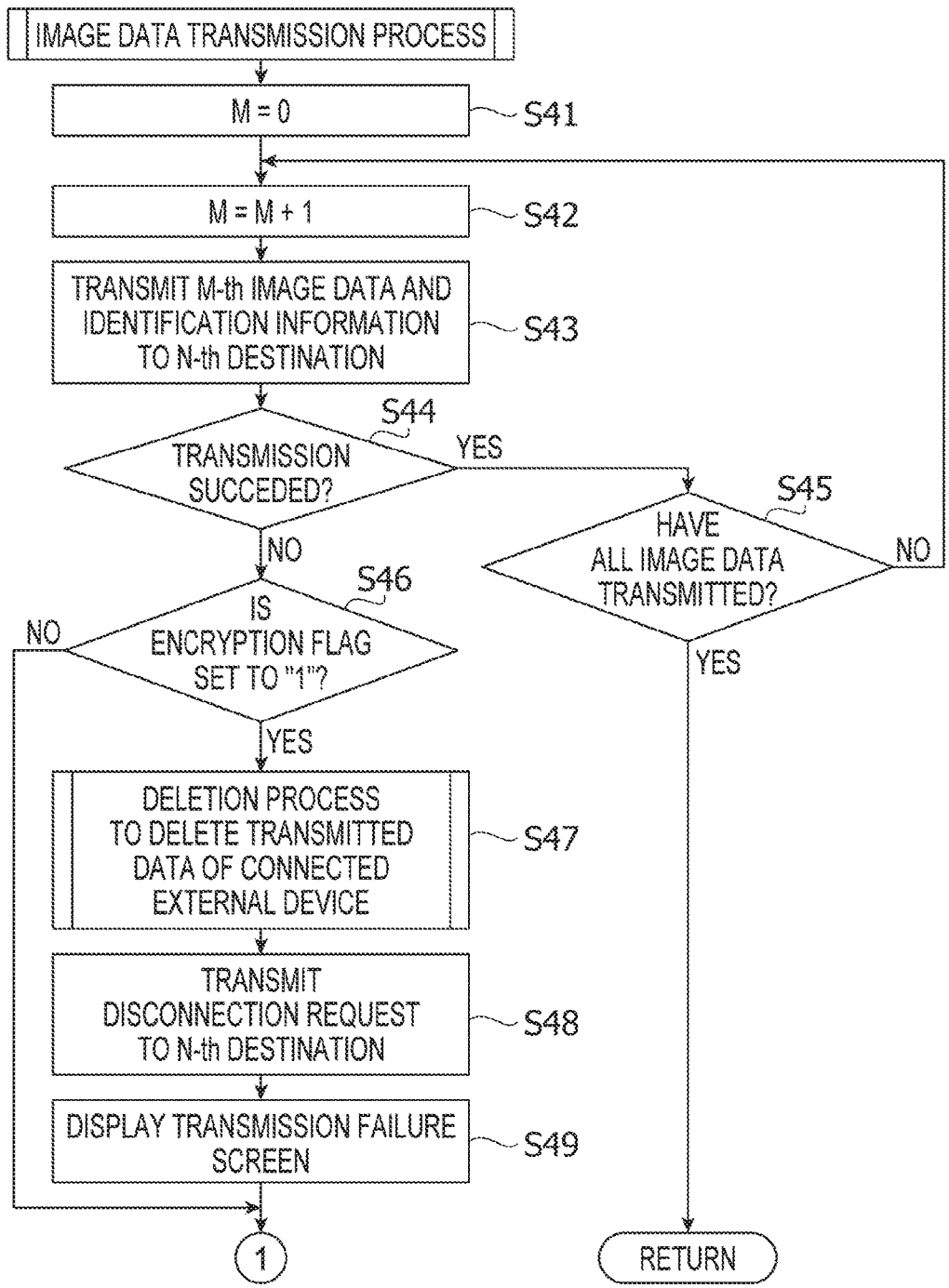
FIG. 6 is a flowchart illustrating an image data transmission process.

It is noted that the CPU 31 also transmits, together with the deletion instruction, the identification information which is the same as the identification information transmitted with the image data in S43 of FIG. 6. It is because, by transmitting the identification information, it becomes possible to avoid a risk that other pieces of image data stored in the designated external device are deleted.

After transmitting the deletion instruction, the CPU 31 controls the network OF 37 to send a disconnection request to the N-th destination (S136). That is, the CPU 31 releases the external device to which the deletion instruction has already been transmitted, so that the external device can executed another job.

Thereafter, the CPU 31 returns to S131, subtracts "1" from the order N of the external device, and executes processes in S32 onwards. That is, the CPU 31 transmits the deletion instruction to the external devices to delete the image data in reverse order starting from one before the external device with which the connection was failed. With this configuration, the CPU 31 can transmit the deletion instruction to all the external devices which have received the image data without fail.

When the deletion instruction is transmitted to all the external devices to which the image data has been successfully transmitted, the order N of the external devices is "0" (S132: YES). Then, the CPU 131 proceeds to S32 of a transmission process shown in FIG. 5.

Figure 5:
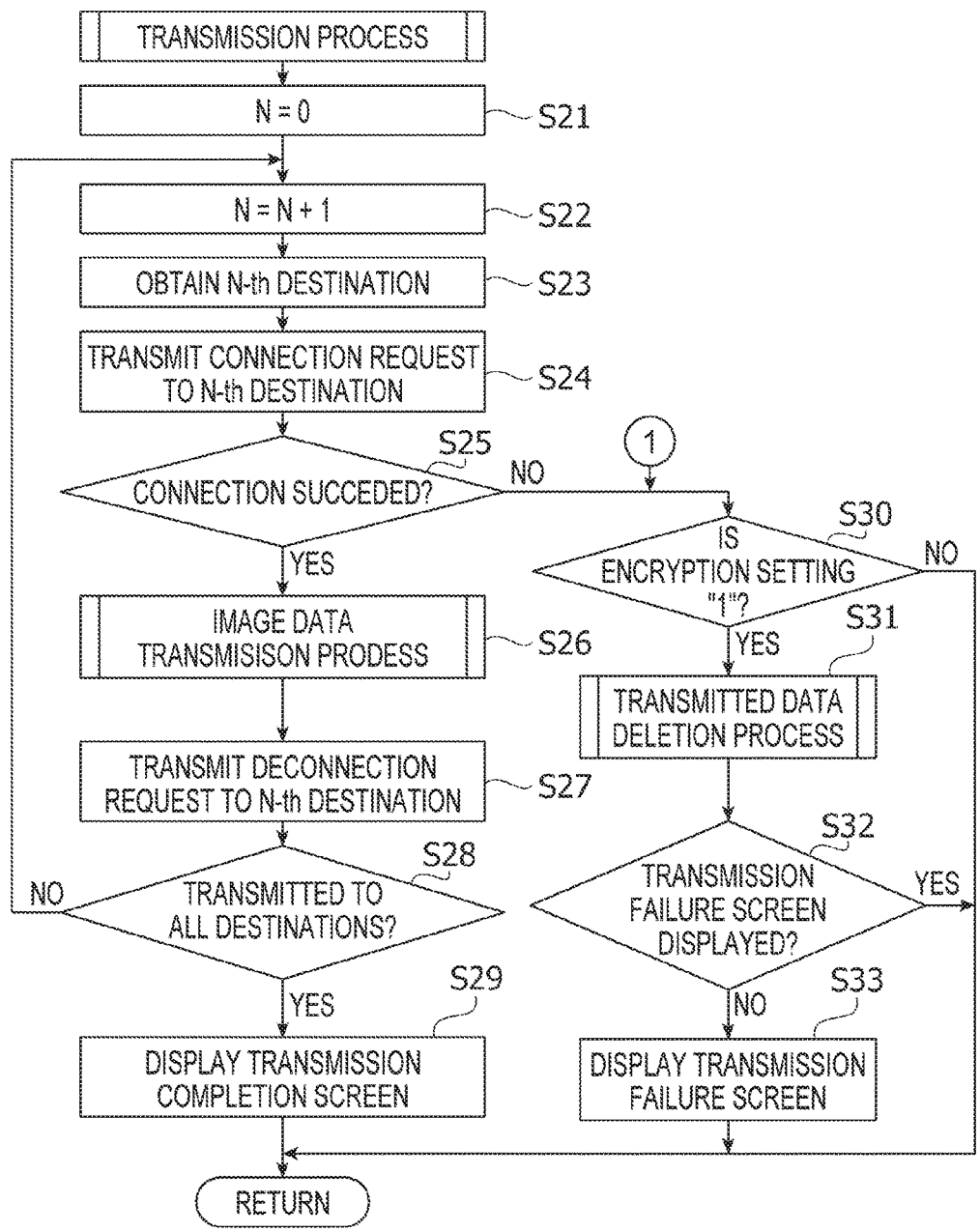
FIG. 5 is a flowchart illustrating a transmission process.

In S32 of FIG. 5, the CPU 31 determines whether a transmission failure screen has been displayed. When, for example, a connection destination is switched from the previous external device to which the image data was successfully transmitted to a next-order external device, if connection to the next-order external device is failed, the transmission error screen indicating the connection is failed has not yet been displayed. As above, when the transmission error screen has not been displayed (S32: NO), the CPU 31 controls the LCD 41 to display the transmission error screen (S33). With this configuration, the user can recognize, by viewing the LCD 41, that the image data subject to transmission cannot be transmitted (S33). Thereafter, the CPU 31 proceeds to S12 of the plural-destination transmission process shown in FIG. 4.

In contrast, when, for example, a connection of an external device of which order is earlier than the current order external device with the MFP 100 is lost when the image data being received, as will be described later in S49 of FIG. 6, the transmission error screen has already been displayed when S32 is executed. When the transmission error screen has already been displayed (S32: YES), the CPU 31 proceeds to S12 of FIG. 4 with remaining the transmission error screen being kept displayed.

Proceeding to S12 of FIG. 5, the CPU 31 deletes the image data stored in the RAM 33, and terminates the plural-destination transmission process. According to the above configuration, it is possible to avoid a case where the CPU 31 unnecessarily transmits the image data to the external devices of which orders are later than the external device to which transmission of the image data was failed.

A concrete example in which the image data having been transmitted is deleted due to failure of connection with the server will be described with reference to FIG. 9.

As an example, it is assumed that a plurality of external devices are designated as transmission destinations, and an FTP server A and a CIFS server A are registered in this order among the plurality of external devices. When the MFP 100 is successfully connected to the FTP server A, the MFP 100 may transmit image data A, B and C to the FTP server A. After completion of the three pieces of image data A, B and C to the FTP server A, the MFP 100 may start transmitting the three pieces of image data A, B and C to the CIFS server A. If the MFP 100 fails to connect with the CIFS server A, the MFP 100 cannot transmits the three pieces of image data A, B and C to the CIFS server A. In such a case, as described above, the MFP 100 transmits the deletion instruction to delete the three pieces of image data A, B and C to the FTP server A. In response to receipt of the deletion instruction, the FTP server A deletes the received image data A, B and C. On the other hand, the MFP 100 does not connect to the external devices of which orders are later than the CIFS server A to which the MFP 100 is failed to connect, thereby the three pieces of image data A, B and C not being transmitted to the external device of which orders are later than the CIFS server A.

Since the MFP 100 transmits the image data A, B and C to the designated external devices in accordance with a designated order, it is easy to find an external device to which the image data A, B and C cannot be transmitted (i.e., the CIFS server A in the above-described example). Further, the MFP 100 may transmit the deletion instruction to the external devices of which order is before the external device to which the image data A, the image data B and the image data C were not transmitted. Therefore, it is relatively easy to delete the image data A, B and C having been transmitted. That is, it is possible to avoid omission of deletion of the transmitted data.

As above, when the MFP 100 is unable to transmit the image data A, B and C to the CIFS server A, which is one of the designated external devices, the MFP 100 transmits the deletion instruction to the FTP server A, to which the image data A, B and C have been successfully transmitted, to delete the image data A, the image data B and the image data C. Therefore, a situation where the image data A, B and C are remained in part of the designated external devices such as the FTP server A, while not data is remained in the other of the designated external devices can be avoided. Therefore, when the image data is re-transmitted, it is unnecessary for the user to find the external devices in which the image data A, B and C are remained, but it is only necessary for the user to simply re-transmit the image data A, the image data B and the image data C to all the transmission destinations such as the FTP server A, and the CIFS server A. Accordingly, management of the image data A, B and C is easy. The more the number of transmission destinations is, the more significant the manageability of the data is. Further, in the FTP server A, it is avoidable to unnecessarily store the image data A, B and C in duplicate when they are re-transmitted. Further, a user of the FPT server A is not required to take the trouble to check whether the re-transmitted image data is the same as the image data already stored in the FTA server A.

It is noted that, when the MFP 100 transmits the image data A, B and C to the FTP server A, the identification information is also transmitted. Then, when the deletion instruction to delete the image data A, B and C is transmitted from the MFP 100 to the FTP server A, the same identification information is also transmitted. The FTP server deletes the image data A, B and C only when the identification information associated with the image data and the identification associated with the deletion instruction coincide with each other. Therefore, in the FTP server A, it is avoidable to delete other image data X when the deletion instruction is received.

Further, when transmission of the image data to the CIFS server is failed, the MFP 100 causes the LCD 41 to display the transmission error screen. Therefore, the user can recognize that transmission of the image data was interrupted at an early stage, and re-transmit the image data.

The MFP 100 receives a setting regarding encryption of the image data A, B and C before transmitted to the external devices such as the FTP server A or the CIFS server A. When the MFP 100 receives a setting to transmit the image data A, B and C after encrypting the same, the MFP 100 executes the transmitted data deletion process and deletes the image data which has been transmitted to the FTP server A. When the MFP 100 has not received such a setting (i.e., the setting to encrypt the image data A, B and C and transmit the same), the MFP 100 does not execute the transmitted data deletion process, and remains the image data A, B and C stored in the FTP server A. The encrypted image data is considered to have high secrecy. According to the embodiment, as the encryption flag stored in the encryption setting storage 35 is set to "1" through the button group 42, it is possible to prevent the image data A, B and C having high secrecy from being remained in the FTP server A.

Incidentally, when a plurality of pieces of image data subject to transmission is stored in the RAM 33, there could be a case where the MFP 100 fails to transmit the image data when the plurality of pieces of image data are being transmitted to one external device. Such a problem may occur typically when a capacity of a memory of the external device is insufficient. When such a problem has occurred, part of the plurality of pieces of image data is remained in the external device, while the remainder of the plurality of pieces of image data is not stored in the external device.

Therefore, in the image data transmission process shown in FIG. 6, when transmission of part of the plurality of pieces of image data which the MFP 100 attempted to transmit is failed (S44: NO), the CPU 31 determines whether the encryption flag stored in the encryption setting storage is set to "1" (S46). When the encryption flag is set to "0" (S46: NO), the CPU 31 does not transmit the deletion instruction to deleted the transmitted image data to the currently connected external device. It is because the secrecy of the transmitted image data is low. When it is determined that the encryption flag is set to "1" (S46: YES), the CPU 31 executes the transmitted data deletion process to delete the part of the plurality of pieces of image data having been transmitted to the currently connected external device (S47). The process of S47 is an example of the deletion process.

Figure 7:
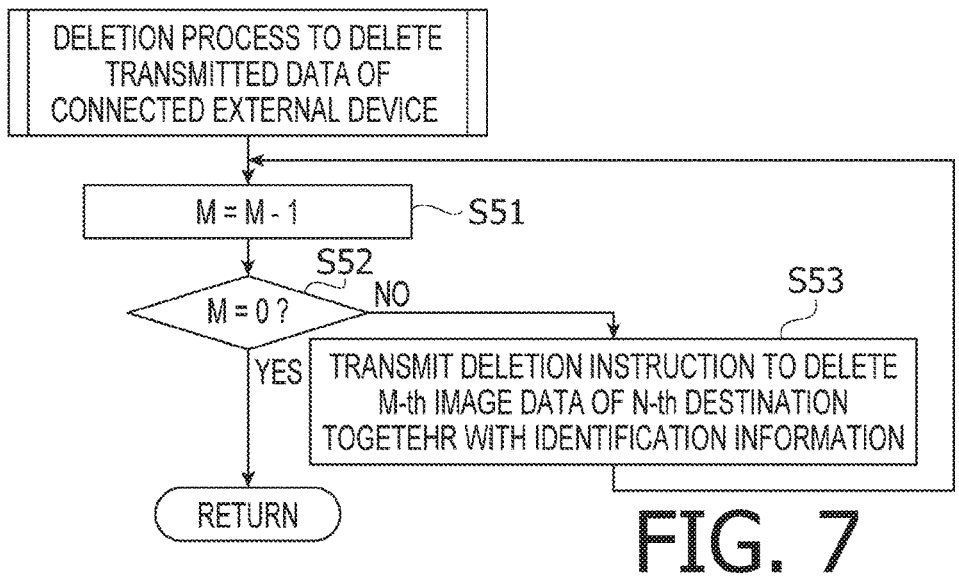
FIG. 7 is a flowchart illustrating a deletion process to delete transmitted data of connected external device.

Hereinafter, the transmitted data deletion process to transmits the deletion instruction to the currently connected external device will be described with reference to FIG. 7. In the transmitted data deletion process, the CPU 31 causes the currently connected external device to delete the image data which has been transmitted.

In S51, the CPU 31 subtracts "1" from the order M of the image data currently being transmitted. With this calculation, the order M indicates the image data which is immediately before the image data of which transmission was failed.

Next, the CPU 31 determines whether the order M of the image data is "0" (S52). When it is determined that the order M is not "0" (S52: NO), the image data transmitted from the MFP 100 is remained in the external device currently connected. In such a case, the CPU 31 control the network I/F 37 to transmits the deletion instruction to delete the M-th image data and the identification information to the N-th destination (i.e., the currently connected external device). Thereafter, the CPU 31 returns to S52, subtracts "1" from the order M of the image data so that the order M indicates the previous piece of image data. As above, the CPU 31 deletes the transmitted image data piece by piece.

In this case, the CPU 31 transmits the identification information which is the same as one transmitted in S43 of FIG. 6 together with the deletion instruction. That is, the CPU 31 transmits the identification information identifying the image data subject to deletion together with the deletion instruction. Therefore, it is avoidable that the image data which is not subject to deletion is deleted.

When the deletion instruction has transmitted for all the pieces of the transmitted image data (S52: YES), the CPU 31 proceeds to S48 of FIG. 6. In S48, the CPU 31 controls the network I/F 37 to transmit a disconnection request to the N-th destination which is currently being connected, and the connection with the N-th external device is cut (S48). Thereafter, the CPU 31 controls the LCD 41 to display the transmission failure screen (S49). The process of displaying the transmission failure screen is the same as S33 of FIG. 5, and description thereof will be omitted.

Thereafter, the CPU 31 proceeds to S30 of FIG. 5, and executes the processes in S30 onwards described above. That is, the CPU 31 transmits the deletion instruction to delete the image data to the external devices of which orders are earlier that the external device to which the failure has occurred during transmission of the image data so that the image data will be remained in none of the designated external devices.

A concrete example of deleting the transmitted data from a currently connected server will be described with reference to FIG. 10.

It is assumed that a plurality of external devices are designated as the transmission destinations of the MFP 100, and in the plurality of external devices, an FTP server A and a CIFS server A are registered in this order. In this case, it is further assumed that the image data A, B and C have been successfully transmitted to the FTP server A, and thereafter, the image data A and B have been successfully transmitted to the next order destination of the CIFS server A but the CIFS server A runs out of the memory when the image data C is being transmitted. In such a case, the image data C cannot be transmitted to the CIFS server A.

Then, the CPU 31 controls the network I/F 37 to transmit, to the CIFS server A, the deletion instruction to delete the second piece of the image data B, and then the deletion instruction to delete the first piece of the image data A. In response to the deletion instructions, the CIFS server A deletes the image data B and the image data A in this order. As a result, none of the transmitted image data is remained in the CIFS server A.

Thereafter, the CPU 31 controls the network I/F 37 to transmit the deletion instructions to the FTP server A which is the previous order of the external device to delete the image data A, B and C. In response to receipt of the deletion instructions, the FTP server A deletes the image data A, B and C. By transmitting the deletion instructions to the external devices to which the image data A, B and C had been successfully transmitted before the image data A, B and C were transmitted to the FTP server A, the transmitted image data can be deleted in a similar manner As described above, when transmission of the image data A, B and C to the CIFS server A, and transmission of image data C to the CIFS server A is failed, the CPU 31 can make none of the transmitted data be remained in the CIFS server A, in the FTP server A and in any other external devices.

As described above, when image data is transmitted to a plurality of external devices 1, 2 and 3, if transmission to a part of the plurality of external devices 1, 2 and 3 is successfully completed but transmission is to the remaining part of the plurality of external devices 1, 2 and 3 is failed, there will be no guarantee that all the transmission destinations (e.g., the external devices 1, 2 and 3) retain the same image data. Therefore, in such a case, the MFP 100 transmits the deletion instructions to the external devices to which data transmission has been successfully completed to delete the image data stored therein. With this configuration, a possibility to avoid a situation where the part of the external devices retain the image data as transmission of the same was succeeded, while the other part of the external devices do not retain the image data since a transmission error was occurred is raised.

It should be noted that the above-described embodiment is only an exemplary embodiment and the aspect of the disclosure should not be limited to the above-described embodiment. Rather, various modifications and improvements of the above-described embodiment should be included within the aspects of the present disclosures. For example, the MFP 100 may be any other device which has an image reading function, and could be a scanner.

According to the above-described embodiment, connection is cut on an external device basis upon completion of transmission of the image data. Such a configuration may be modified such that connection with the external devices may be cut after the image data has been transmitted to all the designated external devices.

Designation of the external devices may be done by selection from a phonebook or input of destinations. Designation of the external devices may be done by both the selection from the phonebook and the input of the destinations. When both methods are employed, it would be convenient since the destination can be set from among extensive possible destinations.

According to the above-described embodiment, the image data is transmitted in accordance with a serial method and the image data is sequentially transmitted to a plurality of the external devices. The transmission method may be changed such that the image data is transmitted to the plurality of external devices simultaneously, in accordance with a parallel method.

Generation of the data name may be fixed to one of the automatic setting and the manual setting.

The MFP 100 described above may be configured such that information indicating whether image data is to be encrypted is stored in the encryption setting storage 35 in the NVRAM 34. Such information may be input through the button group 42 and received by the CPU 31 for each job, and stored in the RAM 33. In such case, when image data is stored in the RAM 33, the CPU 31 may add encryption information indicating whether the image data is to be encrypted or not in association with the respective piece of the image data. Then, when transmission of the image data is failed, the CPU 31 may determine wither the image data is encrypted based on the encryption information associated with the image data. According to the above configuration, when transmission of the image data is failed, opportunities to execute the transmitted data deletion processes may be reduced, thereby load to the deletion process is reduced. It is noted that, when the encryption setting is stored in the NVRAM 34, it becomes unnecessary to make such a setting for each job, and troublesome operations may be avoided.

Further, it is possible to avoid a situation where the encryption setting to encrypt the image data is inadvertently omitted and the image data having higher secrecy may be remained in the external devices.

The transmission failure screen may be displayed before the deletion process is executed. Alternatively, the transmission failure screen may not be displayed. It is noted that, when the transmission failure screen is displayed, the user can easily recognize that transmission of the image data has failed.

Optionally, in the transmission failure screen, an image identifying the external device to which transmission of the image data has failed. According to such a configuration, the user may contact an administrator of the external device to which transmission of image data has filed and ask the administrator to fix a problem.

The CPU 31 may be configured to store an error log in the MFP 100 or a server connected to the MFP 100 in addition to displaying of the transmission failure screen on the LCD 41. The CPU 31 may further be configured to a log of transmission results indicating both successful transmissions and failure of transmissions in the MFP 100 or the server connected to the MFP 100. Further, the CPU 31 may notify the failure of transmission by means of audio message or alarm sound.

The transmission failure screen and a transmission completion screen may be displayed on a display of the user's PC. In such a case, when the user selects a plural-destination transmission function, the user may set a destination of the transmission results. Then, the user can check the transmission results at a desired place remote from the MFP 100 when there are many destinations.

The processes disclosed in the above-described embodiment may be executed by hardware such as a single CPU, a plurality of CPU's and/or an ASIC or a combination thereof. Further, the processes disclosed in the embodiment may be realized by a non-transitory computer-readable recording medium containing programs to execute such processes, methods of performing such processes and/or any other suitable modes.

What is claimed is:
1. An image reading device, comprising:
an image reader configured to read an image on an original document and generate image data corresponding to the image on the original document;
a communication interface configured to interface communication with a first external device and a second external device;
a storage; and
a controller,
wherein, when the first external device and the second external device are designated as transmission destinations of the image data, the controller is configured to execute:
a generating process of causing the image reader to read the image on the original document and generate the image data;
a storing process of storing the image data generated by the generating process in the storage;
a first transmission process of causing the communication interface to transmit the image data stored in the storage to the first external device;
a first determination process of determining whether transmission of the image data to the first external device is successfully completed;

a second transmission process of causing the communication interface to transmit the image data stored in the storage to the second external device;

a second determination process of determining whether transmission of the image data to the second external device is successfully completed;

when the controller determines that transmission of the image data to the first external device is successfully completed and transmission of the image data to the second external device is failed, a deletion process to control the communication interface to transmit a deletion instruction to delete the image data to the first external device.

2. The image reading device according to claim 1, wherein the controller is configured to:

cause, in the first transmitting process, the communication interface to transmit, together with the image data subject to transmission, identification information identifying the image data to the first external device; and cause, in the deletion process, the communication interface to transmit, together with the deletion instruction, identification information identifying the image data subject to deletion to the first external device.

3. The image reading device according to claim 1, further comprising a display device configured to display an image, wherein, when the controller executes the deletion process, the controller controls the display device to display an image indicating failure of transmission of the image.

4. The image reading device according to claim 1, wherein the controller executes the second transmission process when it is determined in the first determination process that transmission of the image data to the first external device is succeeded, and wherein the controller does not execute the second transmission process when it is determined in the first determination process that transmission of the image data to first external device is failed.

5. The image reading device according to claim 1, further comprising a accepting device configured to receive a setting whether to transmit the image data with being encrypted before causing the communication interface to transmit the image data;

wherein the accepting device has received the setting to encrypt and transmit the image data, the controller executes the deletion process, and wherein the accepting device has not received the setting to encrypt and transmit the image data, the controller does not execute the deletion process.

6. An image reading device configured to read an image on an original document and generate image data corresponding to the image on the original document, comprising:

a communication interface configured to communicate with a plurality of external devices;

a storage; and a controller, wherein, when the plurality of external devices are designated as transmission destinations of the image data, the controller is configured to:

control the image reader to cause the image reader to read the image on the original document and generate the image data;

store the image data generated in the generating process in the storage;

control the communication interface to transmit the image data stored in the storage;

determine whether transmitting the image data to each of the plurality of external devices designated as destinations is successfully completed;

in response to determination that there exists at least one external device to which transmission of the image data is failed, control the communication interface to transmit a deletion instruction to delete the image data to the external devices to which transmission of the image data has been successfully completed.

7. An image data transmitting method for an image reading device having an image reader configured to read an image on an original document and generate image data corresponding to the image on the original document, and a communication interface configured to interface communication with a first external device and a second external device, wherein, when the first external device and the second external device are designated as transmission destinations of the image data, the method comprises:

controlling the image reader to read the image on the original document and generate the image data;

storing the image data generated by the generating step in the storage;

controlling the communication interface to transmit the image data stored in the storage by the storing step to the first external device;

determining whether transmission of the image data to the first external device is successfully completed;

controlling the communication interface to transmit the image data stored in the storage to the second external device;

determining whether transmission of the image data to the second external device is successfully completed;

when it is determined that transmission of the image data to the first external device is successfully completed and transmission of the image data to the second external device is failed, controlling the communication interface to transmit a deletion instruction to delete the image data to the first external device.

* * * * *